United States Patent Office 3,055,858
Patented Sept. 25, 1962

3,055,858
METHOD OF PREPARING SILICONE-EPOXIDE RESINS
Cecil L. Frye, University Park, Pa., and William M. McLean, Midland, Mich., assignors to Dow Corning Corporation, Midland, Mich., a corporation of Michigan
No Drawing. Filed May 23, 1957, Ser. No. 661,007
1 Claim. (Cl. 260—42)

This invention relates to an improved method of preparing condensation products of silicones and epoxide resins.

The best methods of preparing silicone-epoxide resins heretofore employed comprises reacting epoxide resins which contain hydroxyl groups with siloxanes which contain silicon-bonded hydroxyl groups or silicon-bonded alkoxy groups. The silicones containing the silicon-bonded alkoxy groups react quite readily with hydroxylated epoxide resins. However, it is often advantageous to employ siloxanes which are essentially free of alkoxy groups and which contain only the silicon-bonded hydroxyl group. It has been found that many otherwise desirable hydroxylated siloxanes condense only after prolonged heating with hydrolated epoxide resins and that after condensation has taken place the resulting materials

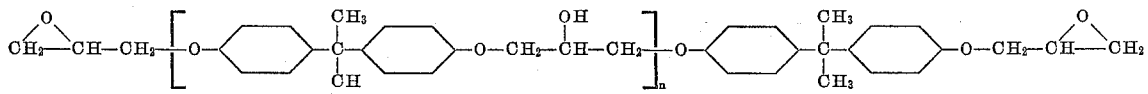

do not give good coating compositions. Consequently it would be highly desirable to have an improved method of preparing silicone-epoxide resins employing these otherwise desirable hydroxylated siloxane resins.

It is the object of this invention to provide an improved method for preparing silicone-epoxide resins. Another object is to provide improved coating compositions. Other objects and advantages will be apparent from the following description.

In accordance with this invention silicone-epoxide resins are prepared by heating a mixture of (1) an organosiloxane containing at least .5% by weight silicon-bonded OH groups, in which essentially all the organic groups are phenyl or monovalent aliphatic hydrocarbon radicals and in which siloxane at least 40% of the total number of hydrocarbon radicals are phenyl, (2) a condensation product of epichlorohydrin and bis-p,p'-hydroxyphenyl-dimethylmethane (hereinafter called bisphenol A), and (3) a catalyst selected from the group consisting of halides and carboxylic acid salts of iron and zinc, until the mixture forms a compatible film when dried.

The method of this invention is particularly adaptable for making silicone-epoxides such as those described in the copending application of Leslie J. Tyler, Serial No. 481,967, filed January 14, 1955. It has been found that when the above-defined catalysts are employed, the cooking time required to form compatible condensation products of resins (1) and (2) is greatly reduced and that the reaction products form much improved coatings on metal and other surfaces.

In carrying out the process of this invention, mixtures of (1), (2) and the catalyst are reacted by heating until the product forms a clear, homogeneous film when applied to a surface and then dried to remove any solvent. In general, the reaction requires from a few minutes to 7 hours depending upon the reactants. In general, the higher the phenyl content of the siloxane resin the faster the reaction will go to completion. If desired, the reaction may be carried out in the presence of solvents such as hydrocarbons such as toluene, xylene, mineral spirits and the like or oxygenated solvents such as ketones, ethers and the like. In general, the reaction temperatures run from 125 to 250° C. although these temperatures are not critical.

The siloxanes which are operative in this invention are those in which at least 40% of the hydrocarbon radicals are phenyl. Thus the siloxane can be homopolymers or copolymers of monophenylsiloxane, diphenylsiloxane or phenyl aliphatic hydrocarbon siloxane units such as phenylmethylsiloxane, phenylvinylsiloxane, phenylethylsiloxane, phenylpropylsiloxane, phenyloctadecylsiloxane or phenylhexenylsiloxane.

In addition, the siloxanes within the scope of this invention can contain siloxane units in which the organic groups are aliphatic hydrocarbon substituted siloxane units such as dimethylsiloxane, monomethylsiloxane, monopropylsiloxane, diethylsiloxane, methylvinylsiloxane, trimethylsiloxane, monooctadecylsiloxane and hexenylmethylsiloxane. The siloxanes can also contain $SiO_2$ units.

The siloxanes of this invention must contain at least 0.5% by weight silicon-bonded hydroxyl groups in order to obtain the improvement upon which this invention is based. There is no critical upper limit to the amount of silicon-bonded hydroxyl group.

The epoxide resins (2) employed in the method of this invention are condensation products of epichlorohydrin and bisphenol A. These resins have the general formula

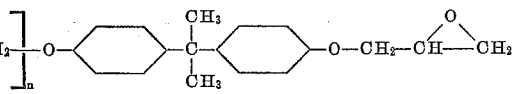

The reaction with the organosilicon compound is believed to take place via the hydroxyl group in the epoxy resin. For the purpose of this invention the value of $n$ is not critical. These resins are commercially-available materials and are sold by several manufacturers.

If desired, the resin (2) can be modified by reacting some of the OH groups with fatty acids. This is especially desirable when air drying paints are desired. Thus, the epoxide resins can be modified with acids such as octanoic, stearic, oleic, linoleic, linolenic and licanic.

The catalyst employed in the method of this invention can be any halide of zinc such as zinc chloride, zinc bromide, zinc iodide or any halide of iron such as ferric chloride, ferric bromide, ferrous chloride and ferrous bromide and the catalyst can be any carboxylic acid salt of these two metals. Specific examples of such carboxylic acid salts are ferric acetate, zinc naphthenates, zinc octoate, ferric octoate, zinc benzoate, ferric adipate, and zinc stearate. Preferably the carboxylic acids should have from 1 to 12 carbon atoms.

The condensation products of this invention are particularly useful for coatings. They can be cured on a surface either by heating alone or by heating in the presence of an epoxide condensation catalyst such as polyfunctional amines such as ethylene diamine, ethylene triamine, etc. The products of this invention lend themselves equally well to the formation of clear varnishes and pigmented coatings.

The following examples are illustrative only and should not be construed as limiting the invention which is properly delineated in the appended claims.

The epoxide resin employed in the following examples was a condensation product of epichlorohydrin and bisphenol A having an epoxide equivalent of from 300 to 375 and an equivalent weight of 130. The epoxide equivalent is the grams of resin containing 1 gram equivalent of epoxide and the equivalent weight is the grams of resin required to completely esterify 1 gram mol of monobasic acid, e.g. 60 grams of acetic acid.

*Example 1*

200 g. of the epoxide resin, 500 g. of a 40% solution in toluene of a siloxane resin consisting of 53 mol percent phenylmethylsiloxane, 28 mol percent monomethylsiloxane, 14 mol percent monophenylsiloxane and 5 mol percent diphenylsiloxane containing about 3% by weight silicon-bonded hydroxyl groups were mixed and heated at 130° C. until the epoxide resin dissolved. About .5 g. of FeCl$_3$.6H$_2$O dissolved in methylamylketone was then added to the solution and the mixture was heated up to 218° C. over a period of 4 hours with the removal of solvent. The resin was then cooled, diluted with 300 cc. of xylene and 200 cc. of methylisobutylcarbinol. The resulting product gave a clear, homogeneous film when dried.

An identical run made without the ferric chloride catalyst did not yield compatible xylene soluble products.

Example 2

A mixture of 100 g. of the epoxide resin, 667 g. of a 60% toluene solution of a copolymer of 25 mol percent monomethylsiloxane, 35 mol percent monophenylsiloxane, 20 mol percent dimethylsiloxane and 20 mol percent diphenylsiloxane containing 3% by weight silicon-bonded OH groups was heated to 80° C. 6 g. of a 15% ferric chloride solution in the dimethylether of diethylene glycol was then added. The mixture was heated at from 115 to 140° C. for 1 hour. The resulting resin gave a clear, cured film. The solution was cooled and filtered and the product yielded a tough film when cured at 250° C.

Example 3

250 g. of an 80% toluene solution of an epoxide resin in which 40 mol percent of the hydroxyl groups had been esterified with linseed oil fatty acids were mixed with 381 g. of a 50% toluene solution of a copolymer of 42 mol percent monophenylsiloxane and 58 mol percent monoethylsiloxane containing about 1% by weight silicon-bonded hydroxyl groups and .8 g. of ferric chloride hexahydrate. The mixture was then heated to 122° C. with the removal of solvent over a period of 1½ hours. The product dried to a clear resin.

Without the catalyst the processing time required to give a clear product was 6 hours.

Example 4

80 parts by weight of a copolymer of 55 mol percent phenylmethylsiloxane, 30 mol percent monomethylsiloxane and 15 mol percent monophenylsiloxane containing 3% by weight silicon-bonded hydroxyl groups and 20 parts by weight of the epoxide resin were dissolved in butyl acetate. Zinc chloride was then added in amount to give .16% by weight zinc based on the total weight of the two resins. The mixture was then heated at 130 to 140° C. to give a compatible mixture which dried to a clear film.

Example 5

75 g. of the epoxide resin and 225 g. of a copolymer of 35 mol percent phenylmethylsiloxane, 10 mol percent dimethylsiloxane, 25 mol percent monomethylsiloxane and 30 mol percent monophenylsiloxane were dissolved in 200 g. of toluene and .73 g. of ferric chloride hexahydrate was added. The mixture was then heated for 8 hours at reflux temperature to give a product which dried to a clear film.

Example 6

300 g. of the epoxide resin, 300 g. of a copolymer of 30 mol percent monopropylsiloxane and 70 mol percent monophenylsiloxane containing 3.5 percent by weight silicon-bonded hydroxyl groups and 7.4 g. of zinc octoate were dissolved in 400 g. of xylene. The solution was heated at reflux for 6 hours whereupon a clear film was obtained when the solution was dried. The product was diluted with 150 g. of methylisobutyl ketone and 50 g. of xylene. The resulting solution was applied to steel panels and cured by heating 16 hours at 200° C. The resulting coating had excellent adhesion, good flex and impact strength and was not thermoplastic.

The process was repeated in the absence of the zinc octoate. It required 10 hours' reaction time in order to give a clear film. After the material was placed on steel panels and cured 16 hours at 200° C. the resulting film showed poor flexural and impact strength and was still thermoplastic.

Example 7

Improved coating compositions are obtained when the reactants of Example 6 are reacted in the presence of the following catalysts:

Ferric naphthenate
Ferric bromide
Zinc acetate
Zinc benzoate
Zinc stearate

That which is claimed is:

A method of preparing improved siloxane-epoxide resins which comprises heating a mixture of (1) an organosiloxane containing at least .5% by weight silicon-bonded hydroxyl groups in which essentially all of the organic groups are selected from the group consisting of phenyl and monovalent aliphatic hydrocarbon radicals and in which at least 40 percent of the number of hydrocarbon groups are phenyl, (2) a condensation product of epichlorohydrin and bis-p,p'-hydroxyphenyldimethylmethane and (3) a catalyst selected from the group consisting of halides and carboxylic acid salts of iron and zinc, until the mixture forms a compatible film when dried.

References Cited in the file of this patent

FOREIGN PATENTS 760,309    Great Britain _____ Oct. 31, 1956

UNITED STATES PATENT OFFICE
CERTIFICATE OF CORRECTION

Patent No. 3,055,858            September 25, 1962

Cecil L. Frye et al.

It is hereby certified that error appears in the above numbered patent requiring correction and that the said Letters Patent should read as corrected below.

Columns 1 and 2, lines 27 to 30, the formula should appear as shown below instead of as in the patent:

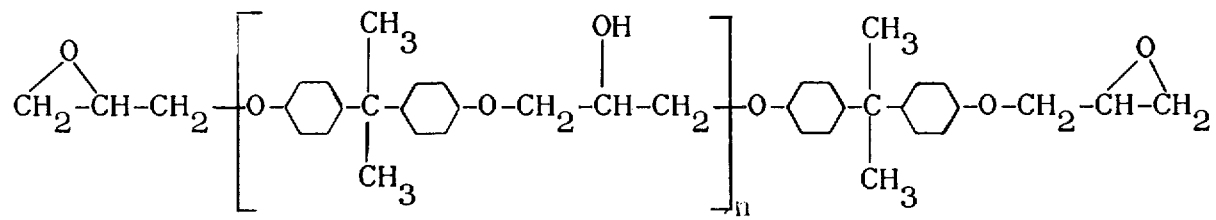

Signed and sealed this 16th day of April 1963.

(SEAL)
Attest:

ERNEST W. SWIDER
Attesting Officer

DAVID L. LADD
Commissioner of Patents